GEORGE B. WINDSHIP.
Improvement in Lifting Apparatus.
No. 123,804. Patented Feb. 20, 1872.
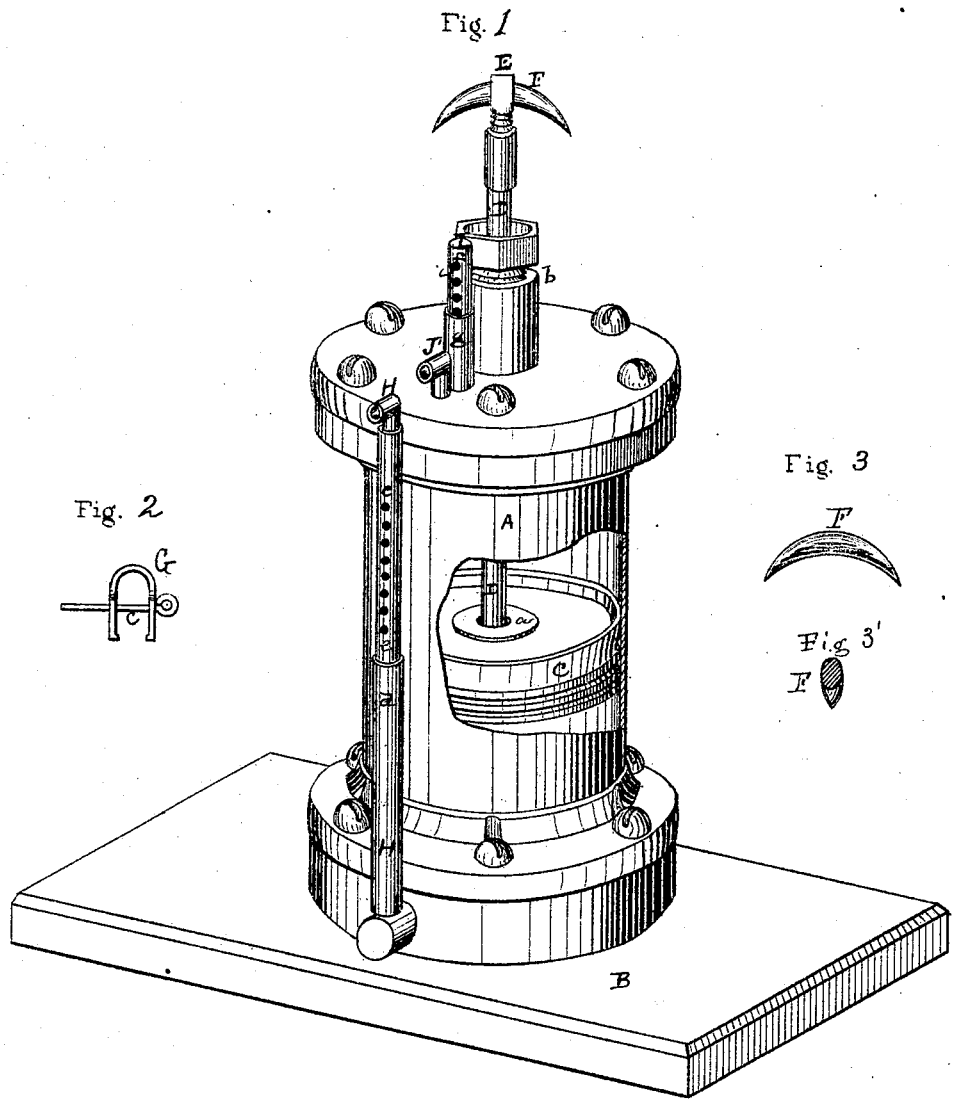

UNITED STATES PATENT OFFICE.

GEORGE B. WINDSHIP, OF BOSTON, MASSACHUSETTS.

IMPROVEMENT IN LIFTING APPARATUS.

Specification forming part of Letters Patent No. 123,804, dated February 20, 1872.

*Know all men by these presents:*

That I, GEORGE B. WINDSHIP, of Boston, in the county of Suffolk and State of Massachusetts, have invented a new and useful Atmospheric Lifting Apparatus and Strength-Tester, to be used as a substitute for weights in the business of physical culture, of which the following specification is sufficient to enable one skilled in the art to practice my invention.

SPECIFICATION.

The nature of the invention consists in the application of an air-compressing or an air-exhausting cylinder, for lifting purposes, in an apparatus for physical culture, and is thus carried out in practice: First, by arranging, in combination with the piston-rod of an air-compressing or air-exhausting cylinder, a lifting-handle or attachment for a lifting-yoke; second, by arranging, at either end of the cylinder, induction or exhaust-valves of limited area, and closed to any desired extent by covers, slides, or the like, so as to control the admission or expulsion of air to or from the cylinder, within and between the limits of free expulsion or admission, and no expulsion or admission to any desired degree; third, by arranging therewith gauge-pipes, to which may be attached gauges to measure the exertion applied; fourth, by an adjusting-screw applied to the piston-rod and lifting-loop, thus adapting the height of the lifting-connection to various sizes of person; fifth, by the arrangement alternately, at will of the user, of a lifting-lune or lifting-link with the lifting-loop; sixth, in the form of the lifting-lune.

The drawing represents, in Figure 1, an isometric perspective view of the apparatus, with part of the cylinder broken away to show the interior; in Fig. 2, the lifting-link; in Fig. 3, the lifting-lune in elevation, with a median section below, as Fig. 3'.

Description.

A is a metallic cylinder, firmly fastened to the platform B. A piston, C, having in it any ordinary air-pump valve, $a$, and suitably packed on its edges, is placed within, and the piston-rod D extends upward through the cylinder-cover and stuffing-box $b$. A nut is made in the top of the piston-rod, and the lifting-loop E screwed therein. This is a screw eyebolt. The lifting-lune F may be passed through the eye, as shown in Fig. 1; and upon the lateral hooks thus formed the rings or hooks of the yoke-chains, described in my patent of September 12, 1865, No. 49,945, may be attached for yoke-lifting. For hand-lifting, the lifting-link G is applied by means of bolt $c$ passed through the eye of the loop, and a handle passed through the link in any desired form—such as a suitable wooden cross-bar or the ring-ended iron bar usual on lifting-machines. A pipe, H, enters the cylinder below the piston. This pipe is closed at its upper end by a cap or by a vacuum-gauge. It should be of small area compared with the size of the cylinder—say a half-inch pipe to an eight-inch cylinder. The side of this pipe is pierced with a series of holes, $e$, of small diameter—say not exceeding a tenth to an eighth of an inch in size—and its exterior is accurately turned and finished. A close-fitting sliding sleeve, $d$, on this pipe, affords the means of closing any one or more or all of these holes so as to shut off the supply of air to the bottom of the cylinder to any desired degree. A pipe, I, extends through the top of the cylinder, closed at top by a cap or pressure-gauge, and similarly finished on its exterior, with a similar series of holes, $f$, and a similar sliding sleeve, $g$. A separate pipe may be used at either end, as the gauge-pipe or the gauge may be applied to a continuation of the valve-pipe.

In the drawing, the pipe J' on the head of the cylinder is the gauge-pipe, and is separate from valve-pipe I, while the valve-pipe H at the bottom is also the gauge-pipe.

Operation.

If we close the holes in pipe H, leaving those in pipe I open, and draw up the piston, we, of course, lift the atmosphere above the piston C, and by admitting air through one or more of the holes $e$ we may reduce the weight lifted from, say, seven hundred and fifty pounds, with an eight-inch cylinder, to any less amount. If, on the contrary, we close the holes in pipe I, leaving those in the pipe H open, we lift against an air-spring or constantly-increasing resistance of compressed air, and the amount of this resistance may be similarly modified by the uncovering of one or more of the series of holes $f$. The nature of the lift may be further modified by a combination of these two.

Advantages.

The ordinary steam and vacuum gauges give an excellent and convenient means of exhibiting the amount of exertion expended; but a platform balance or scale may be adjusted as the foot-support in connection with platform B so as to show the same result. The form of the lifting-lune F is one of great strength, and, it will be seen, compels the hooks or links of the yoke-chains to lie close to the lifting-loops on each side, so as to make the draw of each chain perfectly even on the piston-rod; and, the loop E having an oval orifice and the lune being also made oval in cross-section to fit it when the horns are down, it can never turn to spill the chains, but will rather draw firmer and tighter while lifting. The construction of the lifting-loop with its two attachments, lune, and link, renders the change from yoke-lifting to hand-lifting, and vice versa, very easy and rapid, and, by the screw on the lifting-loop, an easy adjustment is made to suit various heights of person.

I claim and desire to secure by Letters Patent—

1. In combination with the piston-rod of an air-compressing or air-exhausting apparatus, the arrangement of a lifting-handle or yoke attachment substantially as and for the purpose described.

2. The arrangement, with the cylinder of such apparatus, of the valves H $d$ $e$ or I $f$ $g$, or their equivalents, operating, substantially as described, to regulate the weight lifted and its character.

3. The continuation of said valve-pipes H and I as gauge-pipes, or the attachment of independent gauge-pipes J', for the attachment of pressure and vacuum gauges to indicate the exertion expended, substantially as described.

4. The nut in the head of piston-rod D, when arranged with lifting-loop E, constructed and operating as and for the purpose described.

5. The alternate arrangement of lifting-link G or lifting-lune F with lifting-loop E, substantially as and for the purpose described.

6. The lifting-lune G, formed substantially as and for the purpose described.

GEORGE B. WINDSHIP.

Witnesses:
   THOS. WM. CLARKE,
   JOHN HALEY.